United States Patent
Wilensky et al.

(10) Patent No.: US 9,501,848 B2
(45) Date of Patent: Nov. 22, 2016

(54) FITTING A PARAMETRIC CURVE USING MAXIMUM CURVATURE

(71) Applicant: Adobe Systems Incorporated, San Jose, CA (US)

(72) Inventors: Gregg D. Wilensky, Pacific Palisades, CA (US); Nathan A. Carr, San Jose, CA (US); Stephen N. Schiller, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 223 days.

(21) Appl. No.: 14/016,987

(22) Filed: Sep. 3, 2013

(65) Prior Publication Data
US 2015/0062129 A1   Mar. 5, 2015

(51) Int. Cl.
*G06T 11/20*   (2006.01)
*G09G 5/02*   (2006.01)

(52) U.S. Cl.
CPC .................................. *G06T 11/203* (2013.01)

(58) Field of Classification Search
CPC .............................. G06F 17/00; G06T 11/203
See application file for complete search history.

(56) References Cited

U.S. PATENT DOCUMENTS

| | | | |
|---|---|---|---|
| 5,940,083 A | 8/1999 | Broekhuijsen | |
| 6,067,094 A | 5/2000 | Schuster | |
| 6,614,456 B1 * | 9/2003 | Rzepkowski et al. | 715/833 |
| 6,641,456 B2 | 11/2003 | Wang | |
| 6,829,380 B1 | 12/2004 | Choo et al. | |
| 7,868,887 B1 | 1/2011 | Yhann | |
| 2003/0065476 A1 | 4/2003 | Schmidt et al. | |
| 2004/0109479 A1 | 6/2004 | Heinrich | |
| 2009/0141038 A1 * | 6/2009 | Newaskar et al. | 345/589 |
| 2010/0060642 A1 | 3/2010 | Chhaparwal et al. | |
| 2010/0289802 A1 * | 11/2010 | Falchetto | 345/442 |
| 2011/0210943 A1 | 9/2011 | Zaliva | |
| 2011/0301915 A1 | 12/2011 | Lobato et al. | |
| 2011/0305379 A1 | 12/2011 | Mahfouz | |
| 2014/0240322 A1 | 8/2014 | Brumer et al. | |
| 2015/0289149 A1 | 10/2015 | Ouyang et al. | |
| 2015/0325016 A1 | 11/2015 | Carr et al. | |

FOREIGN PATENT DOCUMENTS

| | | |
|---|---|---|
| CN | 102147600 | 8/2011 |
| EP | 1562138 | 8/2005 |
| GB | 2520120 | 5/2015 |

OTHER PUBLICATIONS

Wang Xiao-li, Jiang Cheng-shun and Sun Qing-hui, "Selecting Optimal Parameter Value of Single Parameter Line Simplification Algorithm Based on Maximum Curvature", 2010 International Conference on Web Information Systems and Mining, IEEE Computer Society, pp. 146-149.*

(Continued)

*Primary Examiner* — Sing-Wai Wu
(74) *Attorney, Agent, or Firm* — Wolfe-SBMC

(57) ABSTRACT

Parametric curve fitting using maximum curvature techniques are described. In one or more implementations, a parametric curve is fit to a segment of a plurality of data points that includes a first data point disposed between second and third data points by setting a point of maximum curvature for the segment of the curve at the first data point. A result of the fitting is output by the computing device.

20 Claims, 10 Drawing Sheets

(56) References Cited

OTHER PUBLICATIONS

David Salomon, "Curves and Surfaces for Computer Graphics", 2006 Springer Science + Business Media, Inc., Chapter 1 section 1.4.2, pp. 16-18.*
Hafsa Deddi, Hazel Everett and Sylvain Lazard, "Interpolation with curvature constraints", Curve & Surface Fitting, Vanderbilt University Press, Dec. 15, 2009, 13 pages.*
Machine translation of CN102147600—Wang_CN102147600_EngXlate.*
Havemann, Sven et al., "Curvature-Controlled Curve Editing Using Piecewise Clothoid Curves", *Computers & Graphics 37 (2013).*, retrieved from <http://www.sciencedirect.com/science/article/pii/S0097849313000915> on Aug. 12, 2013, (2013), pp. 764-773.
Baran, et al.,' "Sketching Clothoid Splines Using Shortest Paths", Eurographics '0x, vol. 0 (1981), No. 0, 2009, 15 pages.
Bertails-Descoubes, "Super-Clothoids", Eurographics 2012, vol. 31, No. 2, 2012, 10 pages.
Deddi, et al.,' "Interpolation with Curvature Constraints", Curve & Surface Fitting, Vanderbilt University Press, Dec. 15, 2009, 13 apges.
Grimm, et al.,' "Just Draw It! A 3D Sketching System", Eurographics Symposium on Sketch-Based Interfaces and Modeling, 2012, 15 pages.
Habib, et al.,' "Fairing Arc Spline and Designing by Using Cubic Bezier Spiral Segments", Mathematical Modeling and Analysis, vol. 17, No. 2, pp. 141-160, Apr. 2012, 21 pages.
Hoffmann, et al.,' "On Interpolation by Spline Curves with Shape Parameters", Proceedings of the 5th International Conference on Advances in Geometric Modeling and Processing, Springer-Verlag, Berlin, Heidelberg, GMP '08, pp. 205-214, 2008, 10 pages.
Kilgard, et al.,' "GPU-Accelerated Path Rendering", Computer Graphics Proceedings, Annual Conference Series, SIGGRAPH Asia 2012, 2012, 10 pages.
Kochanek, "Interpolating Splines with Local Tension, Continuity, and Bias Control", Computer Graphics, vol. 18, No. 3, Jul. 1984, pp. 33-41.
Levien, "From Spiral to Spline: Optimal Techniques in Interactive Curve Design", PhD Thesis, EECS Department, University of California, Berkeley, 2009, 253 pages.
McCrae, et al.,' "Sketching Piecewise Clothoid Curves", Computers & Graphics 33, 2009, pp. 452-461.
Piegl, "On NURBS: A Survey", IEEE Computer Graphics & Applications, Jan. 1991, pp. 55-71.
Sarfraz, et al.,' "Shape-Preserving Curve Interpolation", International Journal of Computer Mathematics, vol. 89, No. 1, Jan. 2012, pp. 35-53.
Thiel, et al.,' "Elasticurves: Exploiting Stroke Dynamics and Inertia for the Real-time Neatening of Sketched 2D Curves", UIST '11, Oct. 16-19, 2011, Santa Barbara, CA, USA, Oct. 16, 2011, pp. 383-392.
Thoo, "Some Derivatives of Newton's Method", PRIMUS XII, 2, Jan. 29, 2001, 17 pages.
Yoshida, et al.,' "Log-Aesthetic Space Curve Segments", 2009 SIAM/ACM Joint Conference on Geometric and Physical Modeling, ACM, New York, NY, USA, SPM '09, 2009, 12 pages.
Yuksel, et al.,' "Parameterization and Applications of Catmull-Rom Curves", Computer-Aided Design, vol. 43, No. 7, Aug. 23, 2010, 24 pages.
Zayer, "A Nonlinear Static Approach for Curve Editing", Computers & Graphics 36, 2012, pp. 514-520.
"Combined Search and Examination Report", GB Application No. 1415391.0, Mar. 2, 2015, 7 pages.
"Foreign Office Action", GB Application No. 1415391.0, Sep. 3, 2015, 7 pages.
"Combined Search and Examination Report", GB Application No. 150778.1, Nov. 6, 2015, 8 pages.
"First Action Interview Office Action", U.S. Appl. No. 14/289,408, Feb. 8, 2016, 3 pages.
"Pre-Interview Communication", U.S. Appl. No. 14/289,408, Dec. 4, 2015, 3 pages.
Final Office Action, U.S. Appl. No. 14/289,408, Jul. 14, 2016, 24 pages.

\* cited by examiner

1000

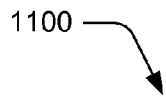

Algorithm 1 Quadratic κCurve Algorithm for $i = 1 .. N - 1$ do        ▷ estimate initial positions $r_i$
    $r_i = (r_{c_{i-1}} + r_{c_i})/2$
end for
while not converged do
    for $i = 0 .. N - 1$ do        ▷ update max curvature times
        $t_{c_i} = $ computeMaxCurvatureTime$(r_i, r_{c_i}, r_{i+1})$
    end for
    Solve matrix system $\mathbf{Ax} = \mathbf{b}$        ▷ update positions
end while
for $i = 1 .. N - 1$ do        ▷ compute Bézier end points
    $r_i = (r_{m_{i-1}} + r_{m_i})/2$
end for

*Fig. 11*

FITTING A PARAMETRIC CURVE USING MAXIMUM CURVATURE

BACKGROUND

Curve fitting refers to the fitting of a curve (e.g., path) between data points. This may be utilized for a variety of different purposes, such as to indicate correspondence of the data points, one to another, for spreadsheets, to draw animation paths, plotting temperatures, and so on.

However, conventional techniques that were utilized to perform curve fitting could depart from the expectations of users that avail themselves of the functionality. For example, unexpected peaks, loops and so on may be observed in a curve fit using conventional techniques between the data points that do not "follow the flow" exhibited by the data points as expected by a user. Consequently, users of conventional techniques were often forced to manually correct the curve, which could be frustrating and inefficient.

SUMMARY

Parametric curve fitting is described that involves use of maximum curvature techniques. In one or more implementations, a curve is fit to a segment of a plurality of data points that includes a first data point disposed between second and third data points by setting a point of maximum curvature for the segment of the curve at the first data point. A result of the fitting is then output by the computing device.

In one or more implementations, a curve is output in a user interface of a computing device and responsive to receipt of an input to select a data point of the curve via the user interface, the data point is set as a point of maximum curvature for a segment of the curve. Responsive to an input defining subsequent movement of the data point in the user interface, the segment of the curve is fit such that the data point remains the point of maximum curvature for the segment of the curve.

In one or more implementations, a system includes at least one module implemented at least partially in hardware. The at least one module is configured to perform operations that include fitting a curve to a plurality of segments of a plurality of data points, each of the segments including a first data point disposed between second and third data points, the first data point set as a point of maximum curvature for the segment. Responsive to receipt of an input to select a new data point along the curve displayed via the user interface, the new data point is set as a point of maximum curvature for a corresponding segment of the curve. Responsive to an input defining subsequent movement of the new data point in the user interface, the corresponding segment of the curve is fit such that the new data point remains the point of maximum curvature for the corresponding segment of the curve.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 11 is an example of a quadratic kCurve Algorithm.

DETAILED DESCRIPTION

Overview

Conventional techniques that are utilized to fit curves to data points, while providing a high degree of mathematical control, may lack sufficient intuitive interaction and ease of use. Further, these conventional techniques could also result in a curve that departed from a user's expectations, such as due to inclusion of peaks, loops, and so on that do not appear to follow the rest of the data points.

Parametric curve fitting techniques that employ maximum curvature are described. In one or more implementations, a curve is fit to data points having intervals that include at least three data points. For each interval, a central data point of the interval that is disposed between at least two other data points is set as a point of maximum curvature for that interval. Additionally, by using parametric techniques, each point on the curve may be direction evaluated using a simple expression, e.g., position, tangent, normal, curvature, and so on using a close form expression. In this way, the curve fit to the data points may comply with a user's expectations by avoiding inclusion of peaks and loops that do not seem to follow the rest of the data points.

Additionally, these techniques may be configured to support intuitive interaction on the part of a user with the curve. For example, the user may make changes to the curve by selecting a point along the curve. The selected point is then set as a new point of maximum curvature for that interval, which may then be moved (e.g., via gesture or cursor control device) as desired in an intuitive manner. Thus, a user may make changes to a curve as desired by simply grabbing desired points along the curve and moving them. A variety of other functionality may also be supported, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
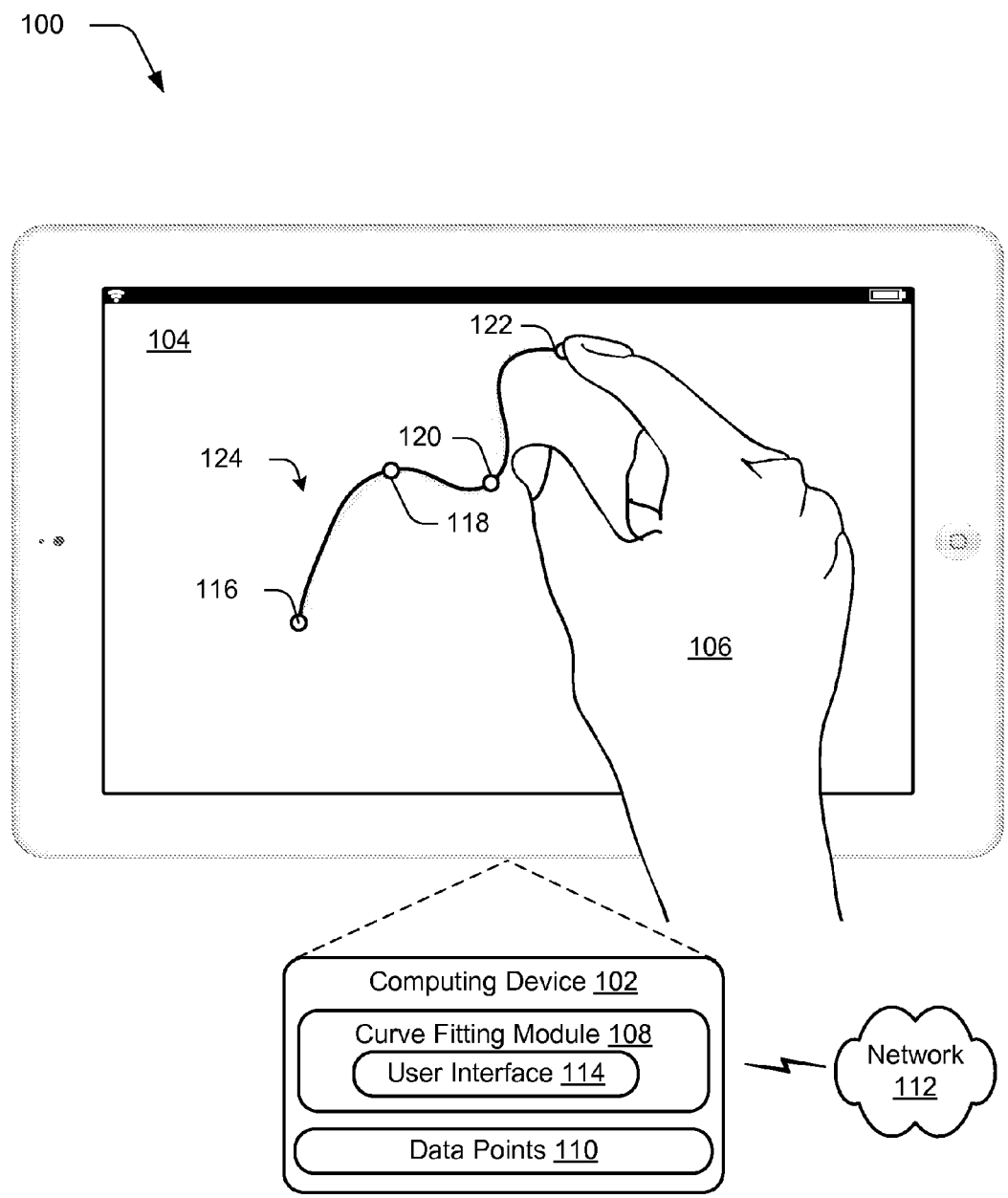
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. For example, as illustrated the computing device 102 is configured in a mobile configuration as a tablet that includes a display device 104 having touchscreen functionality that is configured to recognize touch inputs, such as those from a user's hand 106. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 11.

The computing device 102 is illustrated as including a curve fitting module 108. The curve fitting module 108 is representative of functionality relating to the fitting of a curve to a plurality of data points 110 as well as functionality relating to interaction (e.g., modifying) the curve. Although illustrated as implemented on the computing device 102, the curve fitting module 108 may be implemented in a variety of ways, such as remotely via a web service of a service provider that is accessible "on the cloud" via the network 112, distributed between the service provider and the computing device 102, and so on.

In the illustrated example, a plurality of data points 116, 118, 120, 122 are illustrated as being input via a gesture that is detected via touchscreen functionality of the display device 104, such as through use of one or more capacitive sensors. This may be performed as part of a variety of different functionality, such as to specify a path via which an object is to be animated, used to specify a seam for image processing, and so on. Other examples are also contemplated, such as data points 110 received from a spreadsheet, sensor readings, presentation software, and so on.

The curve fitting module 108, upon receipt of the data points 116-122, may then fit a curve 124 automatically and without user intervention based on the data points 116-122. This may be performed in a variety of ways, such as to leverage a maximum curvature technique such that the data points 118, 120 disposed between end points (e.g., data points 116, 122) are set at a maximum curvature for an interval that includes the data point, further discussion of which may be found in relation to FIG. 2. Additionally, the curve fitting module 108 may support techniques to interact with the curve 124 in an intuitive manner, such as to modify the curve, further discussion of which may be found in relation to FIGS. 3 and 4.

Figure 2:
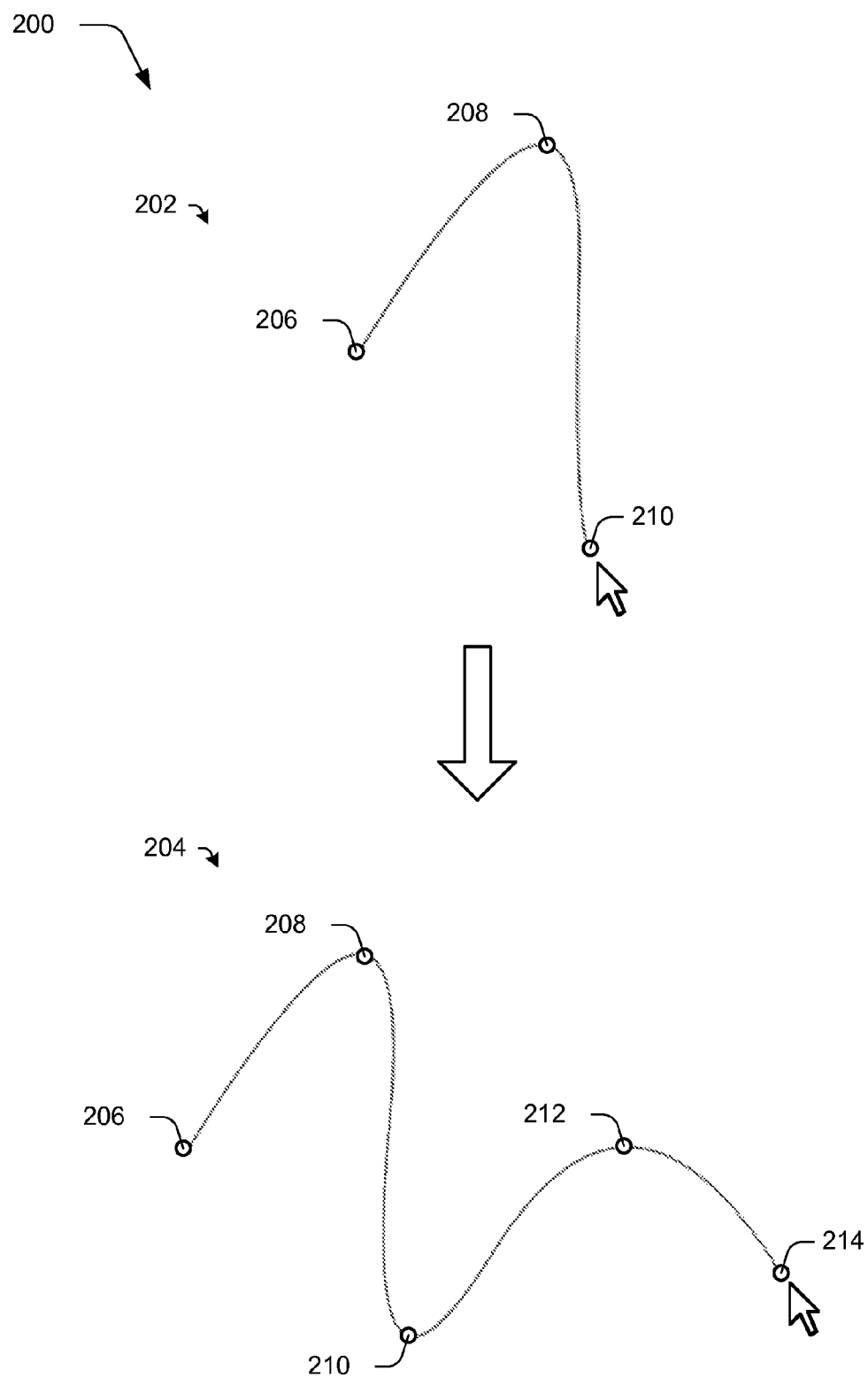
FIG. 2 depicts a system in an example implementation in which a curve is fit to a plurality of data points based at least in part on maximum curvature.

FIG. 2 depicts a system 200 in an example implementation in which a curve is fit to a plurality of data points based at least in part on maximum curvature. The system 200 includes an illustration of the user interface 114 of FIG. 1 showing first and second stages 202, 204 of automatic curve fitting.

At the first stage 202, a cursor control device is utilized to manipulate a cursor to specify data points 206, 208, 210 in a user interface. The data points 206-210 in the first stage 202 define an interval of a curve in that data point 208 is disposed between at least two other data points 206, 210. In response, the curve fitting module 108 fits a curve that connects the data points 206, 208, 210 in succession to form a single continuous line.

A variety of techniques may be utilized to fit a curve. In the illustrated example, for instance, the technique involves maximum curvature such that a data point is set at a point of maximum curvature of the curve for that interval. For example, curvature may be thought of as one over the radius of a circle that could be fit tangent to that location. Therefore, curvature at data point 208 of a segment of a curve that includes data points 206, 208, 210 is at a maximum at data point 208 following a maximum curvature technique. Thus, the slope of a tangent of the curve increases from data point 206 to data point 208 and then decreases from data point 208 to data point 210 such that data point 208 is at the maximum.

At the second stage 204, additional data points 212, 214 are specified by a user through use of a cursor control device to manipulate a cursor in a user interface 114. In this example, each successive data point (e.g., 212, 214) is used to define a new interval of the curve by the curve fitting module 108. Data point 212 once added, for instance, defines an interval in which data point 210 is disposed between data points 208, 212. Therefore, a curve is fit for this segment in which data point 210 is at a point of maximum curvature for the segment. Once data point 214 is added, data point 212 is set at a point of maximum curvature for a segment that includes data points 210, 212, 214.

Thus, the curve at the second stage 204 may be implemented to include a first interval that includes data points 206-210, a second interval that includes data points 208-212, and a third interval that includes data points 210-214. Additional examples are also contemplated, such as a composite curve example in which the end of the one segment is the start of another segment but do not overlap.

Data points that are used to connect one segment of a curve with another segment may be considered a join point. In one or more implementations, slopes of segments that include the join point (e.g., data point 210 for a segment including data points 206-210 with a segment including data points 210-214) are generally continuous, one to another. For example, the addition of data point 214 to define an interval involving data points 210, 212, 214 may also cause an adjustment in slopes of a portion of a segment between data points 208, 210. In this way, the segments of the curve may also correspond to expectations by promoting consistency between the segments. Further discussion of this functionality may be found in relation to the Implementation Example section below. Although use of a cursor control device to specify the data points was described in this example, other examples are also contemplated as previously described. The curve fitting module 108 may also support techniques to modify the curve, an example of which is described as follows and shown in a corresponding figure.

Figure 3:
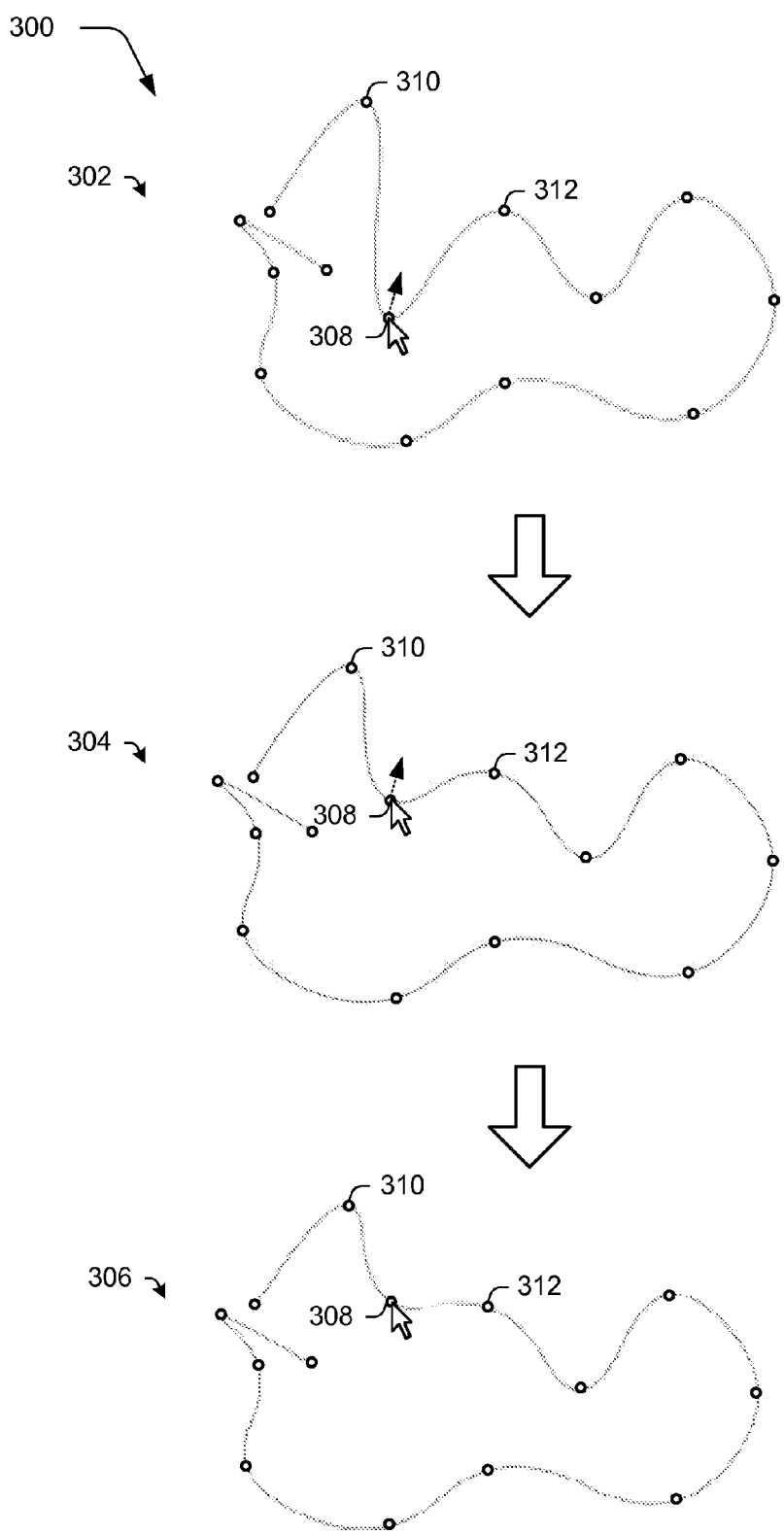
FIG. 3 depicts a system in an example implementation in which movement of an existing data point is shown as modifying a segment of a curve.

FIG. 3 depicts a system 300 in an example implementation in which movement of an existing data point is shown as modifying a segment of a curve. The system 300 includes an illustration of the user interface 114 of FIG. 1 showing first, second, and third stages 302, 304, 306 of automatic curve fitting and modification to a curve. At the first stage 302, a cursor is used to select a data point 308 disposed between data points 310, 312. The data point 308 is at a point of maximum curvature for an interval that includes data points 308, 310, 312.

Once selected, the cursor is used to move the data point 310 upward in the user interface 114 as illustrated through use of an arrow shown in phantom. A result of this movement is shown in the second stage 304. As illustrated, the segment of the curve is recalculated such that data point 308 remains at a point of maximum curvature for the segment as the fitting of the curve continues for the segment. Further, the end points of the segment (e.g., data points 310, 312) are constrained from movement during the movement of the data point 308. Although the data points 310, 312 are not moved, the curve fitting module may still conserve general consistency of the slopes of curvature of adjoining segments due to the configuration of the data points 310, 312 as join points with the adjoining segments of the curve.

In the second stage 304, the cursor is used to continue movement of the data point 310 upward in the user interface 114 as also illustrated through use of an arrow shown in phantom. A result of this movement is shown in the third stage 306. As illustrated, the segment of the curve continues to be recalculated such that data point 308 remains at a point of maximum curvature for the segment as the fitting of the curve continues for the segment. Further, fitting of adjacent intervals may also be configured to maintain continuity of slopes between the intervals, even though the end points (e.g., data points 310, 312) are constrained from movement during the movement of the data point 308 in this example. In this example, an existing data point was moved. Other examples are also contemplated, such as to add data points to facilitate modification to a curve, an example of which is described as follows and shown in a corresponding figure.

Figure 4:
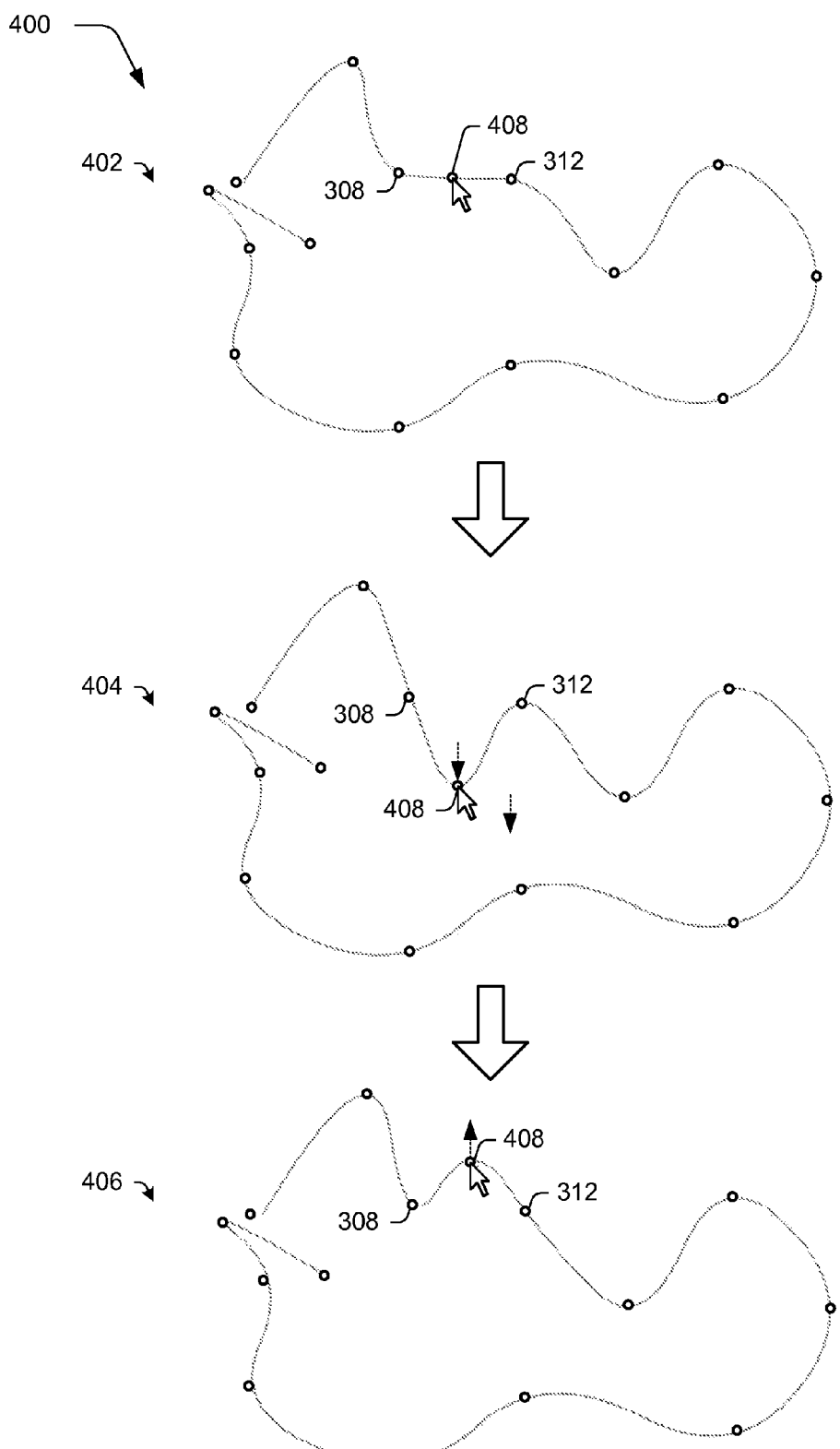
FIG. 4 depicts a system in an example implementation in which addition and subsequent movement of a new data point is shown as defining modifying a corresponding new segment of a curve.

FIG. 4 depicts a system 400 in an example implementation in which addition and subsequent movement of a new data point is shown as defining modifying a corresponding new segment of a curve. The system 400 includes an illustration of the user interface 114 of FIG. 1 showing first, second, and third stages 402, 404, 406 of automatic curve fitting and modification to a curve. At the first stage 402, a cursor is used to specify a new data point 408 disposed between data points 310, 312 that was not previously included as part of the curve. The data point 408 is at a point of maximum curvature for an interval that includes data points 308, 408, 312.

Once selected, the cursor is used to move the data point 408 upward in the user interface 114 as illustrated through use of an arrow shown in phantom. A result of this movement is shown in the second stage 404. As illustrated, the segment of the curve is recalculated such that data point 408 remains at a point of maximum curvature for the segment as the fitting of the curve continues for the segment. Further, the end points of the segment (e.g., data points 308, 312) are constrained from moving during the movement of the data point 408 as before. Although the data points 308, 312 are not moved, the curve fitting module may still conserve general consistency of the slopes of curvature of adjoining segment due to the configuration of the data points 308, 312 as join points with the adjoining segments of the curve.

In the third stage 406, the cursor is used to move the data point 408 downward in the user interface 114 as also illustrated through use of an arrow shown in phantom. As illustrated, the segment of the curve continues to be recalculated such that data point 408 remains at a point of maximum curvature for the segment as the fitting of the curve continues for the segment. Further, fitting of adjacent intervals may also be configured to maintain continuity of slopes between the intervals.

Thus, techniques are presented to enable intuitive control of a composite curve. A user may "grab" any point on the curve and moves it, with each such point ensured to lie at a location of local (m)aximum (c)urvature. Each such point of maximum curvature is then fixed and constrained not to move, unless it is specifically moved. This enables creation and adjustment complex curves in fewer steps and with more intuitive gestures than has been previously the norm.

Figure 5:
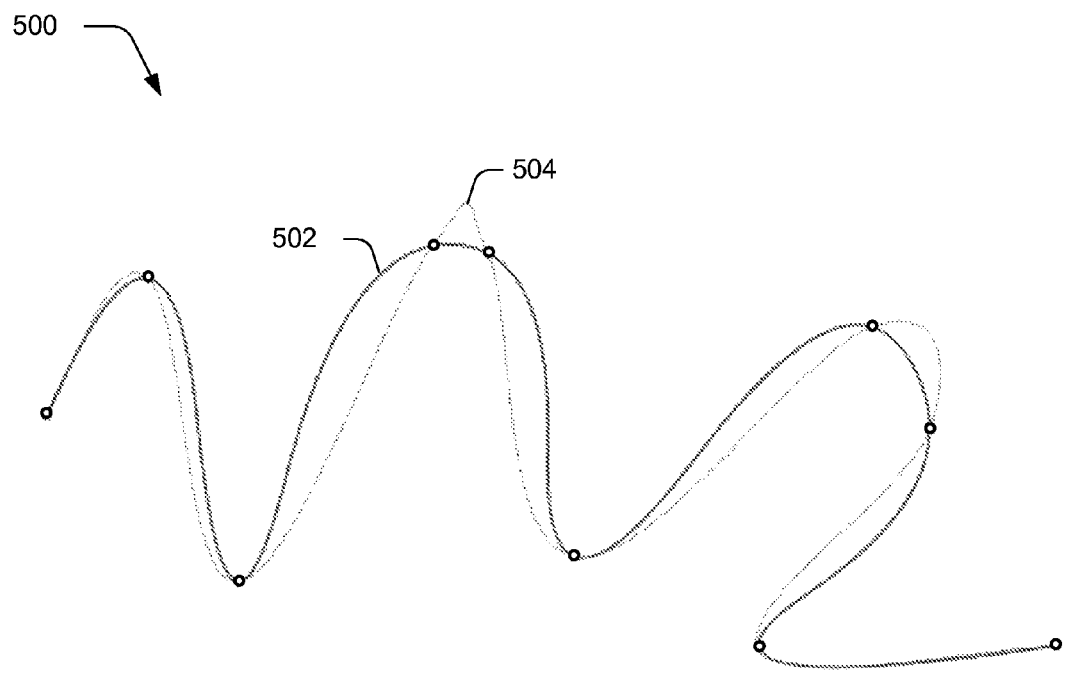
FIGS. 5 and 6 are exemplary implementations showing examples of curves created using conventional techniques and maximum curvature techniques described herein.
Figure 6:
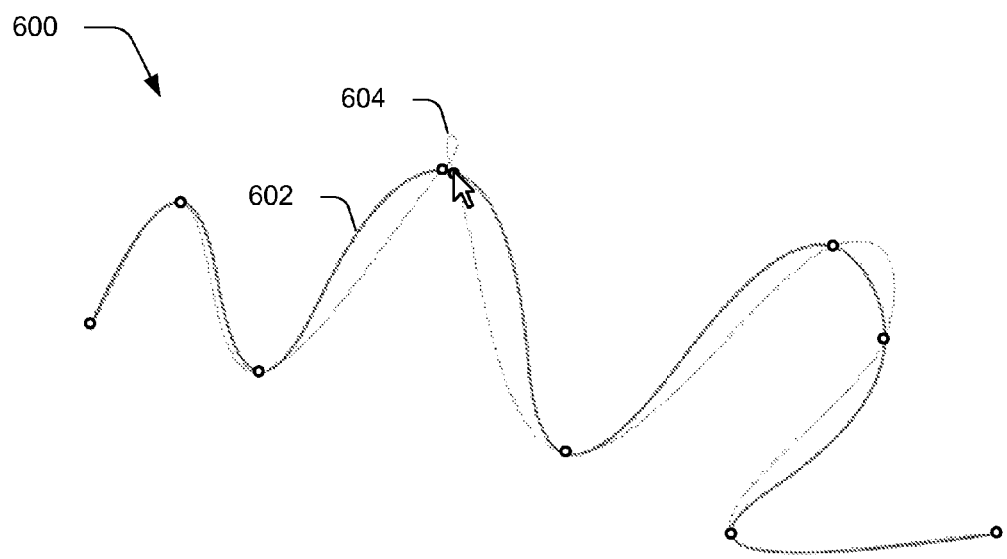

FIGS. 5 and 6 are exemplary implementations 500, 600 showing examples of curves created using conventional techniques and maximum curvature techniques described herein. As shown in FIG. 5, for instance, a curve 502 is fit using maximum curvature techniques that follows expectations of a user when fitting the curve. Another curve 504 fit using conventional techniques, however, includes peaks that depart from a user's expectations. Likewise, a curve 602 using maximum curvature techniques of FIG. 6 generally follows expectations whereas a curve 604 using conventional techniques introduces an unexpected loop.

Further, conventional techniques that were employed to interact with a curve typically involved control points that were arranged "off" the curve, such as controls points to adjust a tangent. Accordingly, the change in the curve using conventional techniques is an indirect result of changing these control points. Thus, conventional techniques were not sufficiently intuitive and required more than the minimum number of user operations to achieve simple goals of creating and editing the curves.

However, in the techniques described herein a user is presented with a curve, which could be a straight or curved line segment. The user may grab hold of any location on the curve and move it. The curve is recalculated to follow the movement, with the location being a data point that remains at maximum curvature. For example, to move a bump on the curve, a maximum curvature marker is placed at the bump and moved. Each such gesture produces a maximum curvature marker, which these markers remaining fixed unless specifically targeted to move. The experience is one of simply moving points directly on the curve and stability is ensured because the constrained points do not move.

Implementation Example Using Bezier Curves

A composite curve may be described as a series of quadratic Bezier curve segments. The series may be continuous in that the end of one segment is the start of the next one, and so on. The two endpoints of this composite curve are constraint points, which means that the points remain fixed unless moved by a user.

Each quadratic Bezier curve has a point of maximum curvature, it may lie at an endpoint of the curve segment or in-between curve segments. If the curve is straight, this maximum curvature point can by default be considered to lie at the midpoint between the two endpoints or anywhere in-between. Each point manipulated by a user becomes a constrained maximum curvature point. The mathematical problem reduces to one of determining the parameters for a series of quadratic Bezier curves constrained so that the endpoints are given and the maximum curvature points are given. The following provides a solution to this problem which keeps the slopes at the join points continuous and ensures that every indicated maximum curvature point does indeed lie at a place of maximum local curvature on the composite curve. Further, the join points may be configured such that subsequent movement of a segment of the curve is greater than movement performed for another segment that is adjacent to the segment. In this way, movement of a new data point (maximum curvature point) in one segment, causes decreasing movement of the curve segments farther away from this segment.

The solution may be cast in the form of a set of coupled nonlinear equations for the unknown Bezier control points given the specified two overall endpoints and the specified maximum curvature points. For "N" maximum curvature points there are "N" curve segments and the solution involves inverting an "N×N" matrix. A variety of different examples involving different Bezier curves is described as follows.

Single Quadratic Bezier Curve

Consider a quadratic Bezier curve of the form as follows:

$$r(t) = (1-t)^2 r_0 + 2t(1-t) r_m + t^2 r_1 \qquad 1)$$

Bold characters indicate two-dimensional vectors. In the above expression, "r(t)" specifies the coordinate trajectory of the curve as parameterized by the time parameters "t" which varies in value between "0" and "1". The value "$r_0$" is the "t=0" endpoint of the curve, "$r_1$" is the "t=1" endpoint of the curve, and "$r_m$" is the (m)iddle control point which determines the velocity vector of the curve trajectory as follows:

$$\frac{dr(t)}{dt} \equiv v(t) = (1-t)v_0 + tv_1 \qquad 2)$$

in terms of the velocities at the two endpoints, $$v_0 = 2(r_m - r_0) = 2r_{m,0} \qquad 3)$$

$$v_1 = 2(r_1 - r_m) = 2r_{1,m} \qquad 4)$$

In this discussion, subscript notation is used as follows:

$$r_{a,b} = r_a - r_b.$$

An equivalent presentation of the velocity is given in terms of the constant acceleration, "$a_0$," along the curve $$v(t) \equiv v_0 + ta_0 \qquad 5)$$

$$a_0 = v_1 - v_0 \qquad 6)$$

$$\left( \frac{d^2 r(t)}{dt^2} \equiv a(t) = a_0 \right)$$

The completeness property of Bernstein polynomial coefficients in the formula for the Bezier coordinate may be leveraged as follows:

$$1 = (1-t)^2 + 2t(1-t) + t^2 \qquad 7)$$

to cast the trajectory in the alternate form $$r(t) = r_0 + 2t(1-t) r_{m,0} + t^2 r_{1,0} \qquad 8)$$

which uses the difference vectors, $$r_{m,0} = r_m - r_0 \qquad 9)$$

and $$r_{1,0} = r_1 - r_0. \qquad 10)$$

Yet another variation of the trajectory formula is $$r(t) = r_0 + t[(1-t)v_0 + t(v_0 + v_1)/2]; \qquad 11)$$

This is equivalent to the equation of motion of an object under constant acceleration as follows:

$$r(t) = r_0 + v_0 t + \frac{1}{2} a_0 t^2 \qquad 12)$$

Maximum Curvature Time

A point "$r_c$" may be specified that lies along the curve and for which the curvature is a maximum. Moving this (m)aximum (c)urvature point provides an intuitive way to interact with and reshape the curve as described above.

For a general parametric curve, the curvature vector "κ(t)" of any point along the trajectory is, by definition, the rate of change per unit arc length, "ds," of the curve's tangent vector, $$"n(t) = \frac{v(t)}{v(t)},"$$

where "v (t)" (not bold) is the speed, the magnitude of the vector velocity, "v (t)."

$$\kappa(t) = \frac{d}{ds} n(t) = \frac{\frac{d}{dt}\left(\frac{v(t)}{v(t)}\right)}{\frac{ds}{dt}} = \frac{v(t) \times a(t)}{v(t)^3} \qquad 13)$$

The signed magnitude of this vector is the signed scalar curvature at time t. Since we are only considering two-dimensional curves the cross product "v(t)×a(t)" is directed into the unused third dimension, which can be specified by the unit vector, "$e_3$." Accordingly the magnitude of the curvature vector is the projection (dot product) of the curvature vector onto the third dimension (z axis, if the curve is specified in the x,y plane).

$$\kappa(t) = \frac{e_3 \cdot (v(t) \times a(t))}{v(t)^3} \qquad 14)$$

Specializing from a general two-dimensional curve to a quadratic Bezier curve provides the simplification that the numerator in the curvature formula is constant, independent of time, "t,"

$$v(t) \times a(t) = v(t) \times a_0 = v_0 \times a_0 \qquad 15)$$

and the velocity vector is linear in time. This leads to the formula for the curvature of a quadratic Bezier curve:

$$\kappa(t) = \frac{v_0 \times a_0}{((v_0 + ta_0)^2)^{3/2}} \qquad 16)$$

The point on the curve, and hence its corresponding time parameter, for which this curvature is maximum is then found. This is equivalent to minimizing the denominator in the above formula. It is sufficient to minimize the speed, or equivalently, it's square. The time, "tc," which determines the maximum curvature point is then found from:

$$0 = d/dt(v_0 + t a_0)^2: \quad\quad\quad 17)$$

$$0 = d/dt(v_0^2 + 2t\, v_0 \cdot a_0 + a_0^2 t^2) = 2(v_0 \cdot a_0 + a_0^2 t) \quad\quad 18)$$

The maximum curvature time parameter is then determined simply as $$t_c = \frac{-v_0 \cdot a_0}{a_0^2}. \quad\quad\quad 19)$$

The corresponding maximum curvature point is then found by using this time in the trajectory formula.

$$r_c = (1-t_c)^2 r_0 + 2 t_c (1-t_c) r_m + t_c^2 r_1 \quad\quad 20)$$

Hence, if the determining curve parameters "$r_0$, $r_m$, and $r_1$" are specified, then this maximum curvature point may be found.

However, rather than specifying a tangent control point "$r_m$," the maximum curvature point may be specified, and from this the Bezier parameters may be determined which place this MC point at the specified location. This leads to a cubic equation to solve for the MC time, "$t_c$."

Specified Maximum Curvature Point; Single Curve Segment

To restate the problem under current consideration, a quadratic Bezier curve is provided with fixed endpoints, "$r_0$" and "$r_1$" along with the maximum curvature coordinate, "$r_c$." The standard middle control point, "$r_m$" may then be found, which leads to this state.

This is accomplished by combining together equations 19) and 20) along with the definitions 3), 4) and 6):

$$r_m = \frac{r_c - (1-t_c)^2 r_0 - t_c^2 r_1}{2 t_c (1-t_c)} \quad\quad 21)$$

$$v_0 = 2(r_m - r_0) = \frac{r_c - (1-t_c^2) r_0 - t_c^2 r_1}{t_c(1-t_c)} = \frac{r_{c,0} - t_c^2 r_{1,0}}{t_c(1-t_c)} \quad\quad 22)$$

$$v_1 = -2(r_m - r_1) = \quad\quad 23)$$
$$-\frac{r_c - (1-t_c)^2 r_0 - (1-(1-t_c)^2) r_1}{t_c(1-t_c)} = -\frac{r_{c,1} + (1-t_c)^2 r_{1,0}}{t_c(1-t_c)}$$

$$a_0 = v_1 - v_0 = -\frac{r_{c,1} + r_{c,0} + (1-2t_c) r_{1,0}}{t_c(1-t_c)} = -2\frac{r_{c,0} - t_c r_{1,0}}{t_c(1-t_c)} \quad\quad 24)$$

Equations 19), 22) and 24) lead to the equation for the maximum curvature time, "$t_c$."

$$t_c = \frac{-v_0 \cdot a_0}{a_0^2} = \frac{1}{2}\frac{(r_{c,0} - t_c^2 r_{1,0}) \cdot (r_{c,0} - t_c r_{1,0})}{(r_{c,0} - t_c r_{1,0})^2} \quad\quad 25)$$

This is a cubic equation which can be solved for "$t_c$."

$$r_{1,0}^2 t_c^3 - 3 r_{c,0} \cdot r_{1,0} t_c^2 + (2 r_{c,0}^2 + r_{c,0} \cdot r_{1,0}) t_c - r_{c,0}^2 = 0 \quad\quad 26)$$

To summarize, given the curve endpoints, "$r_0$" and "$r_1$," along with the specified maximum curvature point, "$r_c$" cubic equation 26 is solved for the maximum curvature time, "$t_c$," and this time is used in equation 21 to determine the quadratic Bezier curve standard middle control point, "$r_m$."

An alternate form of the cubic equation 26 is provided by shifting the time so that it is expressed relative to the halftime value ½.

$$(t_c - 1/2)^3 + \frac{3}{2}\left(t_c - \frac{1}{2}\right)^2 r_{1,0} \cdot \frac{(r_{1,c} - r_{c,0})}{r_{1,0}^2} + \quad\quad 27)$$
$$\left(t_c - \frac{1}{2}\right)\left(\frac{3}{4} - 2\frac{r_{1,c} \cdot r_{c,0}}{r_{1,0}^2}\right) + \frac{1}{8} r_{1,0} \cdot \frac{(r_{1,c} - r_{c,0})}{r_{1,0}^2} = 0$$

The solution of the cubic equation is relatively straightforward. However, an approximate solution may suffice. In particular, a single iteration of Halley's method for root finding gives a good approximation:

$$t_c \cong 1/2 - \frac{1}{p'/p - 1/2\, p''/p'} \quad\quad 27)$$

with $$p'' = 3 r_{1,0} \cdot \frac{(r_{1,c} - r_{c,0})}{r_{1,0}^2} \quad\quad 28)$$

$$p' = \frac{3}{4} - 2\frac{r_{1,c} \cdot r_{c,0}}{r_{1,0}^2}$$

$$p = p''/24$$

The solution may be expressed alternately in terms of the parameter $$\beta_{1,0} = [3 r_{1,0}^2 - 8 r_{1,c0} \cdot r_{c0,0}]/[r_{1,0} \cdot (r_{1,c0} - r_{c0,0})] \quad\quad 29)$$

as $$t_c \cong 1/2 - 1/2 \frac{1}{(\beta_{1,0} - 3/\beta_{1,0})} \quad\quad 30)$$

Composite Quadratic Bezier Curves; Three Curves

In the following, three quadratic Bezier curves are stitched together with consideration given to adjusting the maximum curvature point for the middle curve. The following notation is used to shift the origin of the time parameter for each curve:

$$t_0 \equiv t$$

$$t_1 \equiv t - 1$$

$$t_2 \equiv t - 2$$

The three curves may be expressed as $$r_0(t) = (1-t_0)^2 r_0 + 2 t_0 (1-t_0) r_m + t_0^2 r_1$$

$$r_1(t) = (1-t_1)^2 r_1 + 2 t_1 (1-t_1) r_m + t_1^2 r_2$$

$$r_2(t) = (1-t_2)^2 r_2 + 2 t_2 (1-t_2) r_m + t_2^2 r_3 \quad\quad 31)$$

Figure 7:
FIG. 7 is an example regarding three curves as part of a composite quadratic Bezier curve.

A schematic of the curves is shown in the example 700 of FIG. 7 in which the endpoints, represented by solid squares, are fixed. The middle control points are shown as the symbol "†," and the intermediate endpoints, which are free to move around, as dotted circles.

The curves are continuous by design. The imposition of continuity of the tangent vectors at the join points, "$r_1$" and "$r_2$," is enforced by setting $$r_{m'} = r_1 + \lambda_1(r_1 - r_m) \quad \quad 32)$$

and $$r_{m''} = r_2 + \lambda_2(r_2 - r_{m'}) = r_2 + \lambda_2(r_{2,1} - \lambda_1 r_{1,m}) \quad \quad 33)$$

The curves can then be expressed as $$r_0(t) = r_0 + 2t_0(1-t_0)r_{m,0} + t_0^2 r_{1,0}$$

$$r_1(t) = r_1 + 2t_1(1-t_1)\lambda_1 r_{1,m} + t_1^2 r_{2,1}$$

$$r_2(t) = r_2 - 2t_2(1-t_2)\lambda_2(r_1 + \lambda_1 r_{1,m}) + t_2^2 r_{3,2} \quad \quad 34)$$

The parameters "$\lambda_1$" and "$\lambda_2$" may be used to scale the magnitudes of the tangent vectors at the points "$r_1$" and "$r_2$," respectively. An assumption may be made that the two endpoints $r_0$ and $r_3$ are fixed. In this form it is clear that the unfixed variables are "$r_1, r_2, r_m$" and the scaling parameters are "$\lambda_1$" and "$\lambda_2$." This is a total of eight unknowns since the vectors are two-dimensional.

Three maximum curvature points may be specified, which one on each of the three curves to control the curves. This provides three constraint equations, each of which is two-dimensional. The maximum curvature points are found by setting the time parameters equal to the corresponding maximum curvature times:

$$r_{c_0} = r_0 + 2t_{c_0}(1-t_{c_0})r_{m,0} + t_{c_0}^2 r_{1,0}$$

$$r_{c_1} = r_1 + 2t_{c_1}(1-t_{c_1})\lambda_1 r_{1,m} + t_{c_1}^2 r_{2,1}$$

$$r_{c_2} = r_2 - 2t_{c_2}(1-t_{c_2})\lambda_2(r_1 + \lambda_1 r_{1,m}) + t_{c_2}^2 r_{3,2} \quad \quad 35)$$

These 6 constraints suffice to determine "$r_1, r_2$ and $r_m$" for the specified scaling constants. The solution of the constraint problem is however nonlinear since the maximum curvature times depend upon the vectors that are being found. The cubic equations for the maximum curvature time parameters are:

$$r_{1,0}^2 t_{c_0}^3 - 3r_{c0,0} \cdot r_{1,0} t_{c_0}^2 + (2r_{c0,0}^2 + r_{c0,0} \cdot r_{1,0})t_{c_0} - r_{c0,0}^2 = 0$$

$$r_{2,1}^2 t_{c_1}^3 - 3r_{c1,1} \cdot r_{2,1} t_{c_1}^2 + (2r_{c1,1}^2 + r_{c1,1} \cdot r_{2,1})t_{c_1} - r_{c1,1}^2 = 0$$

$$r_{3,2}^2 t_{c_2}^3 - 3r_{c2,2} \cdot r_{3,2} t_{c_2}^2 + (2r_{c2,2}^2 + r_{c2,2} \cdot r_{3,2})t_{c_2} - T_{c_2} \cdot r_{c2,2}^2 = 0 \quad \quad 36)$$

The challenge is then to solve the coupled nonlinear equations 35) and 36) for the unknown coordinates, $r_1, r_2, r_m$, given the constrained endpoints and maximum curvature point and fixed tangent velocity scaling parameters.

The set of equations 34) may be replaced with the approximate cubic solutions:

$$t_{c_0} \cong 1/2 - \frac{1}{2[3r_{1,0}^2 - 8r_{1,c0} \cdot r_{c0,0}]/[r_{1,0} \cdot (r_{1,c0} - r_{c0,0})] - 6[r_{1,0} \cdot (r_{1,c0} - r_{c0,0})]/[3r_{1,0}^2 - 8r_{1,c0} \cdot r_{c0,0}]} \quad 37)$$

$$t_{c_1} \cong 1/2 - \frac{1}{2[3r_{2,1}^2 - 8r_{2,c1} \cdot r_{c1,1}]/[r_{2,1} \cdot (r_{2,c1} - r_{c1,1})] - 6[r_{2,1} \cdot (r_{2,c1} - r_{c1,1})]/[3r_{2,1}^2 - 8r_{2,c1} \cdot r_{c1,1}]}$$

$$t_{c_2} \cong 1/2 - \frac{1}{2[3r_{3,2}^2 - 8r_{3,c2} \cdot r_{c2,2}]/[r_{3,2} \cdot (r_{3,c2} - r_{c2,2})] - 6[r_{3,2} \cdot (r_{3,c2} - r_{c2,2})]/[3r_{3,2}^2 - 8r_{3,c2} \cdot r_{c2,2}]}$$

This can be restated, following 29) and 30) as $$t_{c_0} \cong 1/2 - 1/2 \frac{1}{(\beta_{1,0} - 3/\beta_{1,0})} \quad \quad 38)$$

$$t_{c_1} \cong 1/2 - 1/2 \frac{1}{(\beta_{2,1} - 3/\beta_{2,1})}$$

$$t_{c_2} \cong 1/2 - 1/2 \frac{1}{(\beta_{3,2} - 3/\beta_{3,2})}$$

where $$\beta_{1,0} = [3r_{1,0}^2 - 8r_{1,c0} \cdot r_{c0,0}]/[r_{1,0} \cdot (r_{1,c0} - r_{c0,0})]$$

$$\beta_{2,1} = [3r_{2,1}^2 - 8r_{2,c1} \cdot r_{c1,1}]/[r_{2,1} \cdot (r_{2,c1} - r_{c1,1})]$$

$$\beta_{3,2} = [3r_{3,2}^2 - 8r_{3,c2} \cdot r_{c2,2}]/[r_{3,2} \cdot (r_{3,c2} - r_{c2,2})] \quad \quad 39)$$

The solution to these coupled nonlinear equations may begin by solving the first of equations 35) for "$r_{m,0}$."

$$r_{m,0} = \frac{r_{c_0,0} - t_{c_0}^2 r_{1,0}}{2t_{c_0}(1 - t_{c_0})} \quad \quad 40)$$

The addition of the first endpoint "$r_0$" results in the expression of the tangent vector "$r_m$" as $$r_m = r_{m,0} + r_0 = \frac{r_{c_0,0} - t_{c_0}^2 + 2t_{c_0}(1-t_{c_0})r_0}{2t_{c_0}(1-t_{c_0})} = \frac{r_{c_0,0} - (1-t_{c_0})^2 r_{1,0}}{2t_{c_0}(1-t_{c_0})} \quad 41)$$

This implies $$r_{1,m} = \frac{r_{1c_0} - (1-t_{c_0})^2 r_{1,0}}{2t_{c_0}(1-t_{c_0})} \quad \quad 41)$$

Substituting this in the second of equations 35) leads to $$r_{c_1} = r_1 + 2t_{c_1}(1-t_{c_1})\lambda_1 \frac{r_{1,c_0} - (1-t_{c_0})^2 r_{1,0}}{2t_{c_0}(1-t_{c_0})} + t_{c_1}^2 r_{2,1}$$

With the definition $$\kappa_1 \equiv \lambda_1 \frac{t_{c_1}(1-t_{c_1})}{t_{c_0}(1-t_{c_0})} \quad \quad 42)$$

This can be rewritten as $$r_{c_1} = r_1 + \kappa_1(r_{1,c_0} - (1-t_{c_0})^2 r_{1,0}) + t_{c_1}^2 r_{2,1}$$

from which "$r_1$" may be solved as follows:

$$r_1 = \frac{r_{c_1} + \kappa_1 r_{c_0} - \kappa_1(1-t_{c_0})^2 r_0 - t_{c_1}^2 r_2}{1 - t_{c_1}^2 + \kappa_1(1-(1-t_{c_0})^2)}$$

The definition, $$\gamma_1 = 1 = t_{c_1}^2 \kappa_1 (1 - (1-t_{c_0})^2), \quad \quad 43)$$

produces the formula $$r_1 = \frac{1}{\gamma_1}\left(r_{c_1} + \kappa_1 r_{c_0} - \kappa_1(1-t_{c_0})^2 r_0 - t_{c_1}^2 r_2\right)$$

And, subtracting "$r_0$" simplifies this to $$r_{1,0} = \frac{1}{\gamma_1}\left(r_{c_1,0} + \kappa_1 r_{c_0,0} - t_{c_1}^2 r_{2,0}\right)$$

or $$\gamma_1 r_{1,0} + t_{c_1}^2 r_{2,0} = r_{c_1,0} + \kappa_1 r_{c_0,0} \quad \text{44)}$$

A complementary equation may be obtained by recognizing the symmetry in the renumbering of points from right to left instead of left to right.
This produces $$\gamma_2 r_{2,3} + (1-t_{c_1})^2 r_{1,3} = r_{c_1,3} + \kappa_2 r_{c_2,3} \quad \text{45)}$$

with the definitions $$\kappa_2 \equiv \lambda_2 \frac{t_{c_1}(1-t_{c_1})}{t_{c_2}(1-t_{c_2})} \quad \text{46)}$$

and $$\gamma_2 = 1 - (1-t_{c_1})^2 + \kappa_2(1-t_{c_2}^2), \quad \text{47)}$$

Thus, the two simultaneous vector equations may be obtained for the two vector unknowns, $r_{1,0}$ and $r_{2,0}$.

$$\gamma_1 r_{1,0} + t_{c_1}^2 r_{2,0} = r_{c_1,0} + \kappa_1 r_{c_0,0} \quad \text{48)}$$

$$(1-t_{c_1})^2 r_{1,0} + \gamma_2 r_{2,0} = r_{c_1,3} + \kappa_2 r_{c_2,3} \beta_3 r_{3,0} \quad \text{48)}$$

with $$\beta_3 \equiv \gamma_2 + (1-t_{c_1})^2 \quad \text{49)}$$

The solution, obtained by inverting the implied two dimensional matrix, is $$r_{1,0} = (\gamma_2 v_1 - t_{c_1}^2 v_2)/\text{determinant} \quad \text{50)}$$
$$r_{2,0} = (-(1-t_{c_1})^2 v_1 + \gamma_1 v_2)/\text{determinant}$$
$$r_{m,0} = \frac{r_{c_0,0} - t_{c_0}^2 r_{1,0}}{2t_{c_0}(1-t_{c_0})}$$

with $$v_1 = r_{c_1,0} + \kappa_1 r_{c_0,0}$$

$$v_2 = r_{c_1,3} + \kappa_2 r_{c_2,3} + \beta_3 r_{3,0} \quad \text{51)}$$

determinant $= \gamma_1 \gamma_2 - t_{c_1}^2 (1-t_{c_1})^2$

The net result is a set of equations for the quadratic Bezier control points given the maximum curvature constraint point times and the two endpoints "$r_0$" and "$r_3$." The times are in turn determined from the control points. Iterating the two sets several times often converges.

Composite Quadratic Bezier Curves, Two Curves

Figure 8:
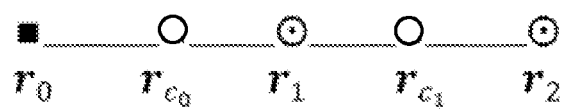
FIG. 8 is an example regarding two curves as part of a composite quadratic Bezier curve.

Having presented the solution for the composite system of three curves, the solution for the simplified problem of a composite of two curves is now presented. An example 800 of the configuration is shown in FIG. 8, in which the maximum curvature points are designed by open circles.

The control point "$r_1$" is determined as in the case of three curves by $$r_{1,0} = \frac{1}{\gamma_1}\left(r_{c_1,0} + \kappa_1 r_{c_0,0} - t_{c_1}^2 r_{2,0}\right) \quad \text{52)}$$

but now "$r_2$" in addition to "$r_0$" is fixed. Similarly the middle control point for the first curve segment is given as $$r_{m,0} = \frac{r_{c_0,0} - t_{c_0}^2 r_{1,0}}{2t_{c_0}(1-t_{c_0})} \quad \text{53)}$$

The cubic equations for the maximum curvature time parameters are:

$$r_{1,0}^2 t_{c_0}^3 - 3r_{c0,0} \cdot r_{1,0} t_{c_0}^2 + (2r_{c0,0}^2 + r_{c0,0} \cdot r_{1,0}) t_{c_0} - r_{c0,0}^2 = 0$$

$$r_{2,1}^2 t_{c_1}^3 - 3r_{c1,1} \cdot r_{2,1} t_{c_1}^2 + (2r_{c1,1}^2 + r_{c1,1} \cdot r_{2,1}) t_{c_1} - r_{c1,1}^2 = 0 \quad \text{54)}$$

with the approximate solution $$t_{c_0} \cong 1/2 - 1/2 \frac{1}{(\beta_{1,0} - 3/\beta_{1,0})} \quad \text{55)}$$

$$t_{c_1} \cong 1/2 - 1/2 \frac{1}{(\beta_{2,1} - 3/\beta_{2,1})}$$

where $$\beta_{1,0} = [3r_{1,0}^2 - 8r_{1,c_0} \cdot r_{c_0,0}]/[r_{1,0} \cdot (r_{1,c_0} - r_{c_0,0})]$$

$$\beta_{2,1} = [3r_{2,1}^2 - 8r_{2,c_1} \cdot r_{c_1,1}]/[r_{2,1} \cdot (r_{2,c_1} - r_{c_1,1})] \quad \text{56)}$$

Composite Quadratic Bezier Curves, Multiple Curves

Figure 9:
FIG. 9 is an example regarding two curves as part of a composite quadratic Bezier curve.

Having found a solution for the special cases of a composite curve consisting of one, two and three curve segments, a general case is now described and a solution presented for an arbitrary number of curves. The problem can be described as follows: two curve endpoints are presented along with one or more maximum curvature points. A series of quadratic Bezier curve segments are to be found which begin at one end point, end at the other and touch each of the maximum curvature constraint points indeed at a point of maximum curvature. An example 900 is illustrated in FIG. 9 in which the squares are the specified constraint points and the open circles along with a single tangent control point are to be determined.

For "N" maximum curvature points, there are "N" quadratic Bezier curve segments and "N" corresponding constraint equations. The quadratic Bezier coefficients are defined as:

$$\mu_a^{(0)} = (1-t_{c_a})^2, \mu_a^{(1)} = 2t_{c_a}(1-t_{c_a}), \mu_a^{(2)} = t_{c_a}^2 \quad \text{57)}$$

This supports writing the following set of coupled equations:

$$\mu_0^{(0)} r_0 + \mu_0^{(1)} r_{m_0} + \mu_0^{(2)} r_1 = r_{c_0}$$
$$\mu_1^{(0)} r_1 + \mu_1^{(1)} r_{m_1} + \mu_1^{(2)} r_2 = r_{c_1}$$
$$\mu_2^{(0)} r_2 + \mu_2^{(1)} r_{m_2} + \mu_2^{(2)} r_3 = r_{c_2}$$
$$\ldots$$
$$\mu_{N-1}^{(0)} r_{N-1} + \mu_{N-1}^{(1)} r_{m_{N-1}} + \mu_{N-1}^{(2)} r_N = r_{c_{N-1}} \quad 58)$$

Continuity of the slopes at each endpoint implies that the Bezier middle control points (which determine tangents or velocities at each endpoint) are each determined from the first one. In the following, this is simplified by setting each of the scaling parameters "$\lambda_n$" to unity:

$$r_{m_0} = r_m$$
$$r_{m_1} = 2r_1 - r_m$$
$$r_{m_2} = 2(r_2 - r_1) + r_m$$
$$r_{m_3} = 2(r_3 - r_2 + r_1) - r_m$$
$$\ldots$$
$$r_{m_N} = 2\sum_{n=1}^{N-1}(-1)^{n-1} r_{N-n} + (-1)^{N-1} r_m \quad 59)$$

Note that these follow the recurrence relation $$r_{m_n} = 2r_n - r_{m_{n-1}}, \; n=1,2,\ldots N \quad 60)$$

The result of these two sets of equations, 58) and 59), is a matrix equation to be inverted to obtain the "N−1" unknown Bezier endpoints and the single first-segment middle control point "$r_m$."

The equations for the maximum curvature times are as presented earlier in 36), 37) and 38); there is one equation for each maximum curvature constraint point. Representing the set of "N" maximum curvature vectors as $$\pi_c = \{r_{c_0} - \mu_0^{(0)} r_0, r_{c_1}, r_{c_2}, \ldots, r_{c_{N-1}} - \mu_{N-1}^{(2)} r_N\} \quad 61)$$

and the set of "N" unknown vectors as $$\pi = \{r_m, r_1, r_2, \ldots, r_{N-1}\} \quad 62)$$

the solution is obtained as $$\pi = M^{-1} \pi_c \quad 63)$$

from the inverse of the "N×N" dimensional matrix "M," which can be defined by its non-zero elements:

$$M_{a0} = (-1)^a \mu_a^{(1)} \text{ for } a=0,1\ldots,N-1$$
$$M_{aa+1} = \mu_a^{(2)} \text{ for } a=0,1\ldots,N-2$$
$$M_{aa} = \mu_a^{(0)} + 2\mu_a^{(1)} \text{ for } 0<a<=N-1$$
$$M_{ab} = (-1)^{a+b} 2\mu_a^{(1)} \text{ for } 2<a, 1<b<a \quad 64)$$

A concrete example helps to clarify the solution. Consider the special case of a curve containing five maximum curvature constraint points, "$r_{c_0}$, $r_{c_1}$, $r_{c_2}$, $r_{c_3}$, and $r_{c_4}$," in addition to the two endpoints, "$r_0$" and "$r_5$." This curve is composed of five quadratic Bezier curve segments; in other words, "N=5."

The five constraint vectors are expressed as $$\pi_c = \{r_{c_0} - \mu_0^{(0)} r_0, r_{c_1}, r_{c_2}, r_{c_3}, r_{c_4} - \mu_4^{(2)} r_5\} \quad 65)$$

and the five unknown coordinate vectors are $$\pi = \{r_m, r_1, r_2, r_3, r_4\} \quad 66)$$

The 5×5 dimensional matrix, "M," is expressed as $$M = \begin{pmatrix} \mu_0^{(1)} & \mu_0^{(2)} & 0 & 0 & 0 \\ -\mu_1^{(1)} & \mu_1^{(0)}+2\mu_1^{(1)} & \mu_1^{(2)} & 0 & 0 \\ \mu_2^{(1)} & -2\mu_2^{(1)} & \mu_2^{(0)}+2\mu_2^{(1)} & \mu_2^{(2)} & 0 \\ -\mu_3^{(1)} & 2\mu_3^{(1)} & -2\mu_3^{(1)} & \mu_3^{(0)}+2\mu_3^{(1)} & \mu_3^{(2)} \\ \mu_4^{(1)} & -2\mu_4^{(1)} & 2\mu_4^{(1)} & -2\mu_4^{(1)} & \mu_4^{(0)}+2\mu_4^{(1)} \end{pmatrix} \quad 67)$$

and the solution for the unknown two-dimensional coordinate vectors requires inverting this matrix:

$$\pi = M^{-1} \pi_c \quad 68)$$

Convergence

It has been found that the system of three fixed maximum curvature points converges well under the following initialization scheme. First, determine the curve endpoints by averaging the immediate neighbor maximum curvature points. From these, estimate the maximum curvature times. Given these time estimates, calculate the unknown quadratic Bezier curve segment endpoints and the tangent control points. This can be iterated several times. Although use of Bezier curves was described in this example, it should be readily apparent that a wide variety of other techniques may also be employed to determine maximum curvature without departing from the spirit and scope thereof.

Composite Quadratic Bezier kCurves

In this section, multiple quadratic Bezier segments are connected together to form continuous kCurves. For "N" maximum curvature points there are "N" quadratic Bezier curve segments and "N" corresponding constraint equations. To simplify the later equations in this example, the quadratic Bezier coefficients may be defined as follows:

$$\alpha_i = (1-t_{c_i})^2$$

$$\beta_i = 2t_{c_i}(1-t_{c_i})$$

$$\gamma_i = t_{c_i}^2$$

where "$t_{c_i}$" denotes a maximum curvature time for each of the "N" specified maximum curvature locations, each of which is indexed by index "i."

For each quadratic Bezier curve, the following coupled equations may be written:

$$\alpha_0 r_0 + \beta_0 r_{m_0} + \gamma_0 r_1 = r_{c_0}$$
$$\alpha_1 r_1 + \beta_1 r_{m_1} + \gamma_1 r_2 = r_{c_1}$$
$$\ldots$$
$$\alpha_{N-1} r_{N-1} + \beta_{N-1} r_{m_{N-1}} + \gamma_{N-1} r_N = r_{c_{N-1}}$$

"G1" continuity means that tangent direction and magnitude (e.g., velocities) are continuous at the join point between curve segments. This condition implies that the Bezier end points are halfway between their adjacent middle control points:

$$r_1 = (r_{m_0} + r_{m_1})/2$$

$$r_2 = (r_{m_1} + r_{m_2})/2$$

...

$$r_{N-1} = (r_{(N-2)} + r_{(N-1)})/2$$

The middle control points may be solved to formulate a solution from which solution to the Bezier endpoints may then be inferred. Using the above expressions, this approach yields, for these control points, a recurrence relation as follows:

$$\frac{1}{2}\gamma_n r_{m_{n+1}} + \left(\frac{1}{2}\alpha_n + \beta_n + \frac{1}{2}\gamma_n\right)r_{m_n} + \frac{1}{2}\alpha_n r_{m_{n-1}} = r_{c_n}$$

The constraint of the known boundary endpoints, "$r_0$" and "$r_{N-1}$" leads to the equations at the boundaries.

$$\frac{1}{2}\gamma_0 r_{m_1} + \left(\beta_0 + \frac{1}{2}\gamma_0\right)r_{m_0} = r_{c_0} - \alpha_0 r_0$$

and $$\frac{1}{2}\alpha_{N-1} r_{m_{N-2}} + \left(\beta_{N-1} + \frac{1}{2}\alpha_{N-1}\right)r_{m_{N-1}} = r_{c_{N-1}} - \gamma_{N-1} r_{N-1}$$

Together these yield a matrix equation "$Ax_m = b$" which can be solved for the unknown vectors:

$$x_m = [r_{m_0}, r_{m_1}, r_{m_2}, \ldots, r_{m_{N-1}}]$$

in terms of the known constraint vectors "b." The matrix has the following tri-diagonal form:

$$A = \begin{bmatrix} \beta_0 + \frac{\gamma_0}{2} & \frac{\gamma_0}{2} & 0 & 0 & \ldots \\ \frac{\alpha_1}{2} & \beta_1 + \frac{\alpha_1 + \gamma_1}{2} & \frac{\gamma_1}{2} & 0 & \ldots \\ 0 & \frac{\alpha_2}{2} & \beta_2 + \frac{\alpha_2 + \gamma_2}{2} & \frac{\gamma_2}{2} & \ldots \\ 0 & 0 & \frac{\alpha_3}{2} & \beta_3 + \frac{\alpha_3 + \gamma_3}{2} & \ddots \\ \vdots & \vdots & \vdots & \ddots & \ddots \end{bmatrix}$$

Figure 10:
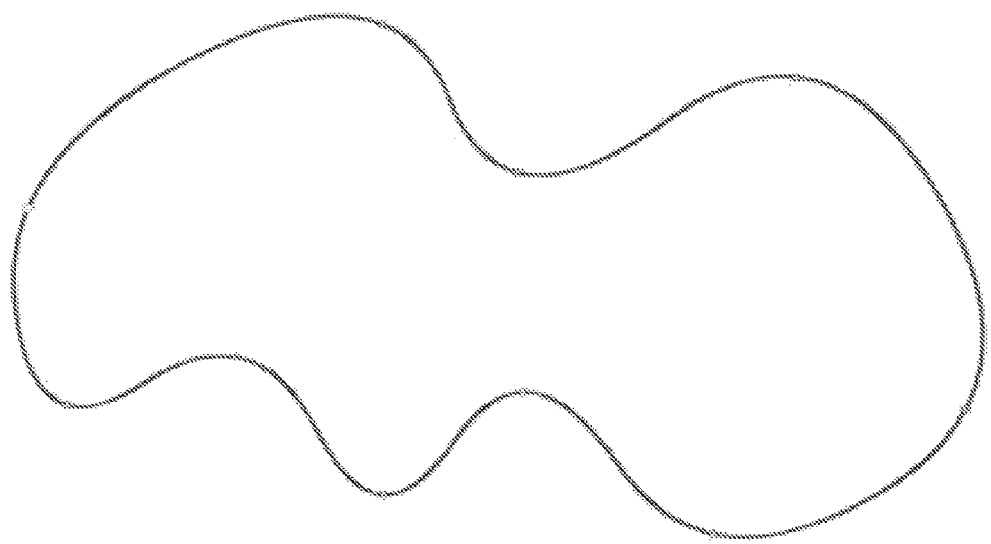
FIG. 10 is an example of a closed curve.

For closed curves (e.g., a curve with no endpoints as shown in the example implementation 1000 of FIG. 10, the matrix A may take on a cyclic tri-diagonal form where both the first and last rows of the matrix contain three non-zero elements. This slightly modified matrix can also be efficiently solved providing a solution for both open and closed curves.

$$A = \begin{bmatrix} \beta_0 + \frac{\alpha_0 + \gamma_0}{2} & \frac{\gamma_0}{2} & 0 & \ldots & \frac{\alpha_0}{2} \\ \frac{\alpha_1}{2} & \beta_1 + \frac{\alpha_1 + \gamma_1}{2} & \beta_2 + \frac{\alpha_2 + \gamma_2}{2} & \frac{\gamma_2}{2} & \ldots \\ 0 & \frac{\alpha_2}{2} & \beta_2 + \frac{\alpha_2 + \gamma_2}{2} & \frac{\gamma_2}{2} & 0 \\ 0 & 0 & \frac{\alpha_3}{2} & \beta_3 + \frac{\alpha_2 + \gamma_3}{2} & \ddots \\ \vdots & \vdots & \vdots & \ddots & \ddots \\ \frac{\gamma_{N-1}}{2} & 0 & \vdots & \ddots & \ddots \end{bmatrix}$$

It should be noted that, apart from the first and last rows, the sum of each of the element on a row is unity from the following completeness relation:

$$\alpha_n + \beta_n + \gamma_n = 1$$

Also, the diagonal element, which are equivalent to:

$$(1 + \beta_n)/2$$

Range in value from ½ to ¾. The maximum value of ¾ occurs when the corresponding maximum curvature time is ½. Furthermore, the matrix is diagonally dominant and, as long as none of the time parameters have values of "0" or "1," then the matrix is strictly diagonally dominant. In such cases, the matrix is known to be non-singular "$(\det(A) \neq 0)$" from a Levy-Desplanques theorem.

FIG. 11 depicts an example 1100 of an algorithm for Quadratic kCurves. The algorithm as described is non-linear in nature. Note that construction of the matrix "A" and right side vector "b" assumes knowledge of the maximum curvature times for each of the maximum curvature points. Computing maximum curvature times "$t_{ci}$" involves knowledge of the locations of the Bezier endpoints "$r_i$," which are the solutions to the matrix system. An optimization scheme as shown in algorithm 1 of FIG. 11.

The algorithm starts by estimating the initial positions "$r_i$" of the curve by averaging the adjacent maximum curvature points. The inner loop comprises updating estimates for the maximum curvature times followed by updating the coordinate positions by solving the matrix equation described above. The subroutine "computeMaxCurvatureTime" solves cubic equation for a maximum curvature time. Time estimates may be improved and then used to produce better locations. These new locations can then be used to re-compute a new set of time estimates and so forth until the system reaches convergence. In one or more implementations, convergence criteria is defined as when the time values "$t_{ci}$" remain nearly unchanged during two successive iterations.

This, in this example the tri-diagonal matrix is more sparse that the previous example and is very fast to solve with increased stability as fewer mathematical operations are involved to solve the system. Although "open" curves are described above, "closed" curves are also contemplated in which each of the points are internal and thus the curve does not include "boundary points."

Example Procedures

The following discussion describes curve techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 12:
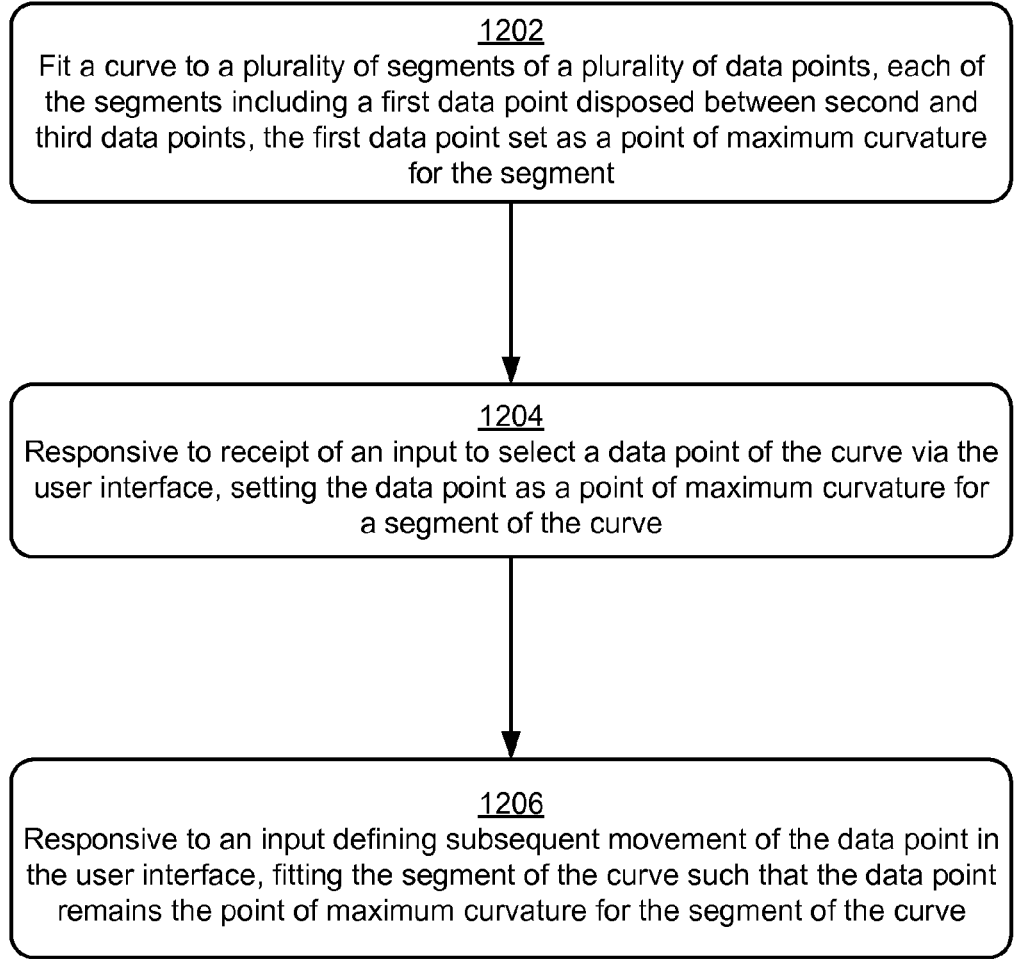
FIG. 12 is a flow diagram depicting a procedure in an example implementation in which a curve is fit and modified by leveraging maximum curvature techniques.

FIG. 12 depicts a procedure 1200 in an example implementation in which a curve is fit and modified by leveraging maximum curvature techniques. A curve is fit to a plurality of segments of a plurality of data points, each of the segments including a first data point disposed between second and third data points, the first data point set as a point of maximum curvature for the segment (block 1202). As before, the curve fitting module 108 may obtain data points 110 from a variety of different sources and fit a curve to those data points by leveraging a maximum curvature techniques such as Bezier curves.

Responsive to receipt of an input to select a data point of the curve via the user interface, the data point is set as a point of maximum curvature for a segment of the curve (block 1204). The data point may be one of the data points used to initially form the curve as described in relation to FIGS. 2 and 3, a new data point as described in relation to FIG. 4, and so on.

Responsive to an input defining subsequent movement of the data point in the user interface, the segment of the curve is fit such that the data point remains the point of maximum curvature for the segment of the curve (block 1206). In this way, fitting of the curve may continue to follow the movement such that the data point remains at a point of maximum curvature for the segment. A variety of other examples are also contemplated.

Example System and Device

Figure 13:
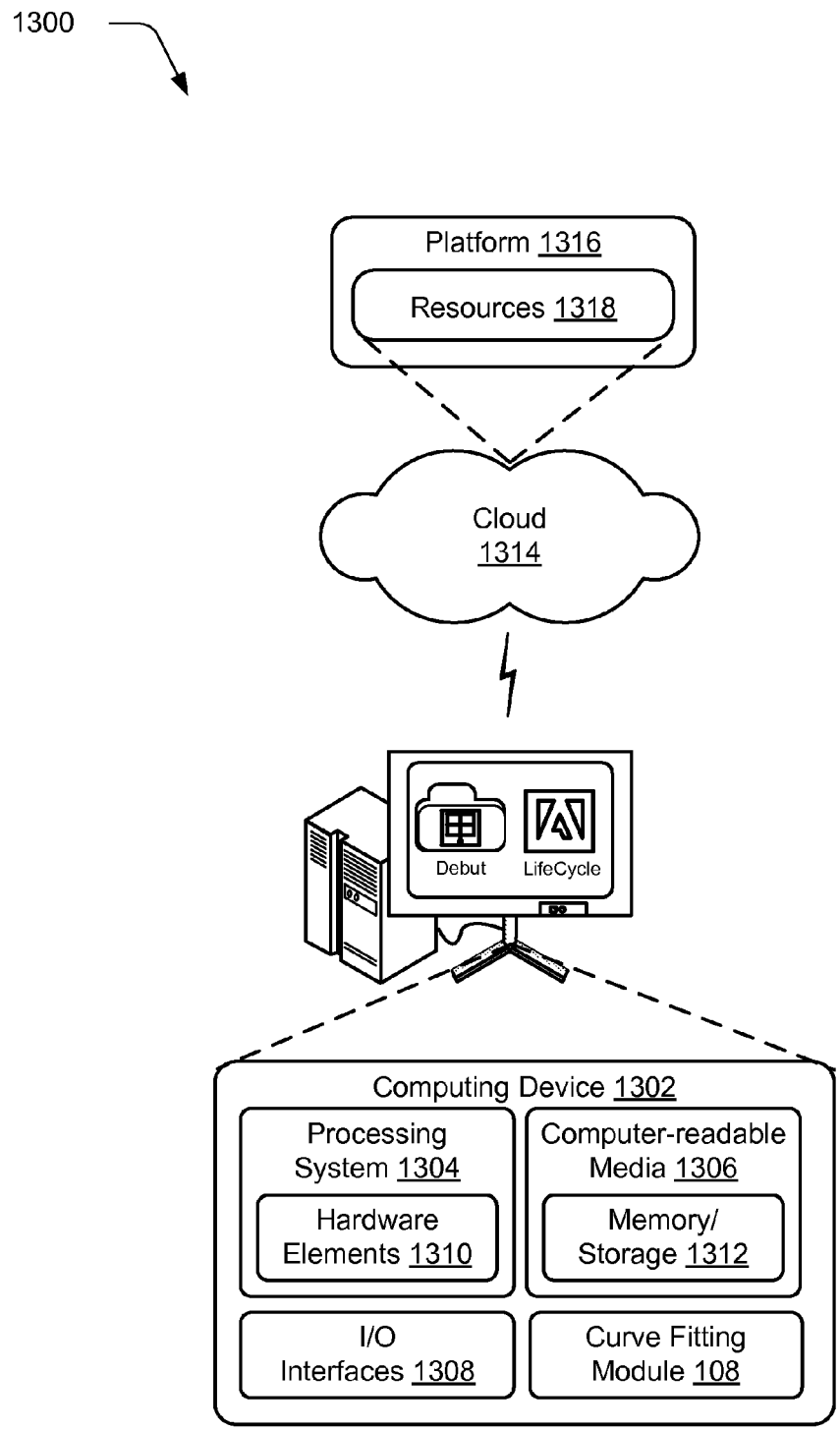
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the curve fitting module 108, which may be configured to fit and/or manipulate curves involving data points. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
    fitting a parametric curve to a segment of a plurality of data points displayed in a user interface generated by the one or more computing devices that includes a first data point on the curve disposed between second and third data points on the curve, said fitting the parametric curve includes setting a point of maximum curvature for the segment of the curve at the first data point on the curve disposed between the second and third data points such that the first data point on the curve disposed between the second and third data points remains the point of maximum curvature for the segment of the curve during subsequent free movement of the first data point on the curve disposed between the second and third data points in the user interface, the second and third data points being constrained from movement during the subsequent free movement of the first data point on the curve disposed between the second and third data points within the user interface; and
    outputting a result of the fitting by the one or more computing devices for display of the curve in the user interface.

2. A method as described in claim 1, wherein the displaying of the curve includes displaying indications of the plurality of data points that are configured to be moved in the user interface responsive to one or more inputs received from a user.

3. A method as described in claim 1, further comprising:
    responsive to receipt of an input to select a new data point along the curve via the user interface, setting the new data point as a point of maximum curvature for a corresponding segment of the curve; and
    responsive to an input defining subsequent free movement of the new data point in the user interface, fitting the corresponding segment of the curve such that the new data point remains the point of maximum curvature for the corresponding segment of the curve.

4. A method as described in claim 2, wherein at least two other data points that also define the corresponding segment remain fixed during the subsequent free movement of the new data point.

5. A method as described in claim 1, wherein the curve includes a plurality of said segments, each being linked, one to another, via a join point such that segments that include the join point have slopes that are generally continuous, one to another.

6. A method as described in claim 5, wherein the fitting is performed such that subsequent movement of the curve is greater than movement performed for another segment that is adjacent to the segment.

7. A method as described in claim 5, wherein at least one of the second or third data points are join points.

8. A method as described in claim 1, wherein the fitting is performed by fitting one or more parametric curves to form the curve.

9. A method as described in claim 7, wherein the one or more parametric curves include quadratic Bezier curves.

10. A method comprising:
    outputting a curve having a parametric form in a user interface of a computing device;
    responsive to receipt of an input via the user interface to select a first data point that is part of the curve and disposed between second and third data points on the curve, setting the first data point that is part of the curve and disposed between the second and third data points on the curve as a point of maximum curvature for a segment of the curve; and
    responsive to an input defining subsequent free movement of the first data point that is part of the curve and disposed between the second and third data points on the curve in the user interface, fitting the segment of the curve such that the first data point that is part of the curve and disposed between the second and third data points on the curve remains part of the curve and at the point of maximum curvature for the segment of the curve, the second and third data points being constrained from movement during the subsequent free movement of the first data point that is part of the curve and disposed between the second and third data points on the curve within the user interface.

11. A method as described in claim 10, wherein the segment of the curve includes the data point as being disposed between at least two other data points included as part of the curve.

12. A method as described in claim 11, wherein the at least two other data points remain fixed as part of the segment of the curve during the subsequent free movement of the data point.

13. A method as described in claim 10, wherein the curve includes a plurality of said segments, each being linked, one to another, via a join point such that segments that include the join point have slopes that are generally continuous, one to another.

14. A system comprising at least one module implemented at least partially in hardware, the at least one module configured to perform operations comprising:
    fitting a curve having a parametric form to a plurality of segments of a plurality of data points, each of the segments including a first data point disposed between second and third data points, said fitting the curve includes the first data point disposed between the second and third data points set as a point of maximum curvature for the segment;
    responsive to receipt of an input to select a new data point on the curve displayed via the user interface, setting the new data point on the curve as a point of maximum curvature for a corresponding segment of the curve; and
    responsive to an input defining subsequent free movement of the new data point on the curve in the user interface, fitting the corresponding segment of the curve such that the new data point on the curve remains the point of maximum curvature for the corresponding segment of the curve, the data points neighboring the new data point on the curve being constrained from movement during the subsequent free movement of the new data point on the curve within the user interface.

15. A system as described in claim 14, further comprising displaying the curve to include indications of the plurality of data points that are configured to be moved in the user interface responsive to one or more inputs received from a user.

16. A system as described in claim 15, wherein at least two other data points that also define the corresponding segment remain fixed during the subsequent free movement of the new data point.

17. A system as described in claim 14, wherein the plurality of segments are linked, one to another, via a respective join point such that segments that include the join point have slopes that are generally continuous, one to another.

18. A system as described in claim 14, wherein the curve also includes at least one point that is not included along the curve that is configured to support manipulation of the curve.

19. A system as described in claim 14, wherein the input to select a new data point along the curve is provided via a cursor control device, command, or gesture.

20. A system as described in claim 17, wherein the fitting is performed such that subsequent movement of the curve is greater than movement performed for another segment that is adjacent to the segment.

* * * * *